A. H. PEYCKE.
BRAKE MECHANISM.
APPLICATION FILED MAY 23, 1919.

1,329,009.

Patented Jan. 27, 1920.
2 SHEETS—SHEET 1.

Witnesses
R. Burkhardt
A. J. Sauser

Inventor
Armand H. Peycke,
By Wilkinson & Huxley
Attys.

A. H. PEYCKE.
BRAKE MECHANISM.
APPLICATION FILED MAY 23, 1919.
1,329,009.
Patented Jan. 27, 1920.
2 SHEETS—SHEET 2.
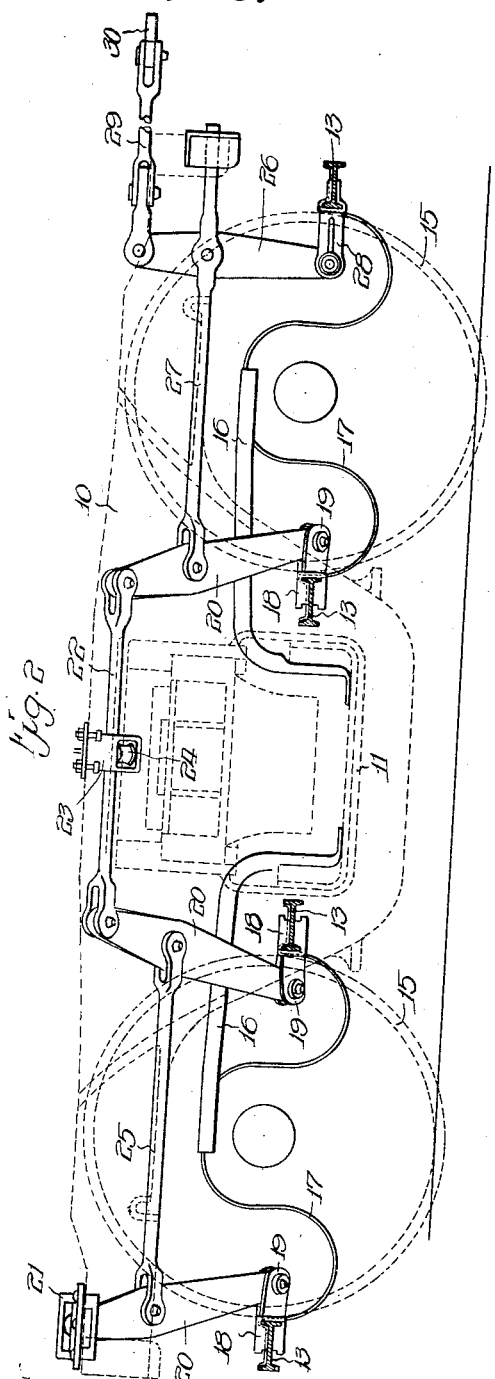
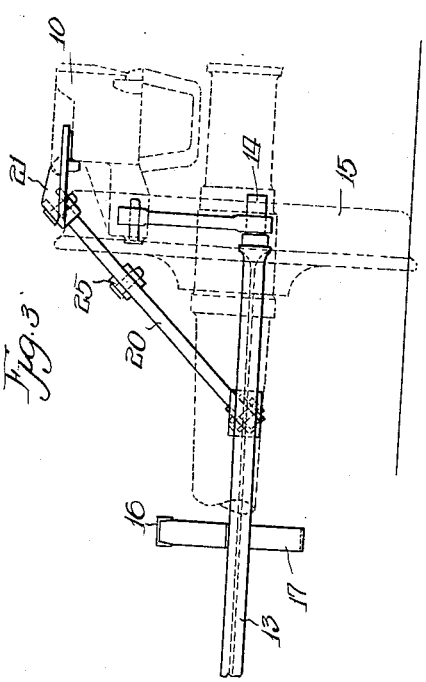
Witnesses
G. Burkhardt
A. J. Sauser
Inventor
Armand H. Peycke,
By Wilkinson & Huxley
Attys

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE MECHANISM.

1,329,009.  Specification of Letters Patent.  Patented Jan. 27, 1920.

Application filed May 23, 1919. Serial No. 299,235.

*To all whom it may concern:*

Be it known that I, ARMAND H. PEYCKE, a citizen of the United States, residing at Chicago, in the county of Cook and State of Illinois, have invented certain new and useful Improvements in Brake Mechanism, of which the following is a specification.

This invention relates to brake mechanism.

The question of clearances in car under-rigging constructions is one which of necessity must be given careful consideration. This fact is particularly true of moving parts, such as brake levers and their operative connections, with respect to each other and to other parts.

It is the object of this invention to provide a simple, strong and efficient brake rigging, particularly adapted to overcome clearance problems and which, at the same time, is relatively inexpensive.

The above and other objects are accomplished by means of the arrangement disclosed on the accompanying sheets of drawings, in which—

Fig. 2 is a fragmentary side elevation of the same; and

Fig. 3 is a fragmentary end elevation of the same construction.

Figure 1:
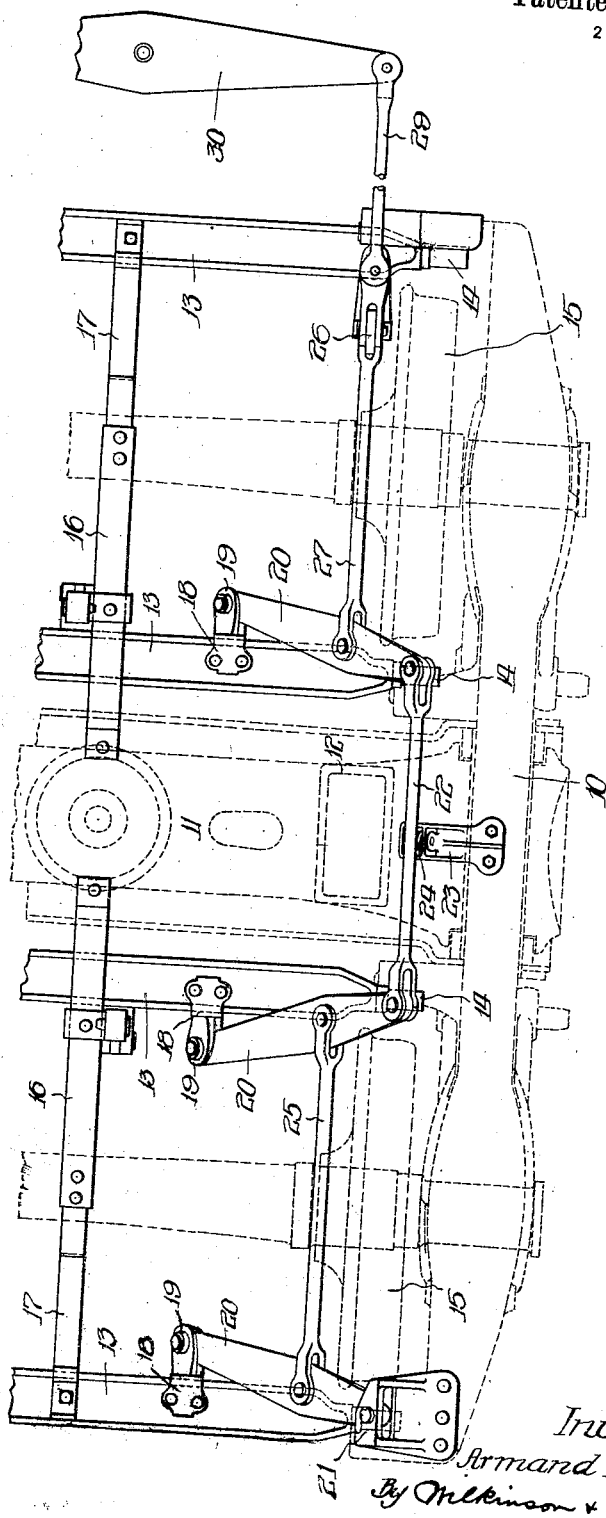
Figure 1 is a fragmentary plan view of a railway car truck embodying my invention.

The various novel features of my invention will be apparent from the following description and drawings and will be particularly pointed out in the appended claims.

Referring to the figures of the drawings, it will be noted that I have shown a railway car truck including side frames 10, only one of which is shown, connected by a bolster 11 and having side bearings 12. A clasp type of brake rigging is shown, in which the brake beams 13 are arranged on opposite sides of each pair of wheels, and provided with trunnions 14 for carrying brake heads (not shown) for operating with braking surfaces of truck wheels 15. Brackets 16 connected to the truck frame and extending longitudinally of the truck, along the middle thereof, support springs 17, which operatively engage the brake beams for releasing the brakes.

The brake beams 13 in this case are of the single bar type as distinguished from the truss type of brake beam, and are provided with fulcrums 18 arranged in sets at each side of the truck. These fulcrums have spaced jaws 19, which are at an angle, preferably of forty or forty-five degrees, with respect to the vertical, for pivotally receiving the lower ends of brake levers 20. The brake lever at the dead end of the truck is pivoted at its upper end to any suitable part 21 of the truck. The intermediate brake levers 20 are connected by the brake rod 22 supported by a bracket 23 carried by the truck side frame 10 and having a roller 24 upon which the rod 22 is movable.

The first three truck levers 20 on each side of the truck, counting from the dead lever end, are inclined forty or forty-five degrees, corresponding to the inclination of the fulcrum jaws 19, the first two truck levers 20 being connected intermediate their ends by a tension rod 25. The truck lever 26 at the live end of the truck is arranged vertically and is connected to the adjacent inclined truck lever 20 by a tension rod 27. This live lever 26 at its lower end is connected with a fulcrum 28 connected in turn to one of the end brake beams 13. The upper end of the vertical truck lever in each case is operatively connected through a tension rod 29 to an equalizing lever 30.

It will be noted that by arranging the live lever 26 vertically as distinguished from the inclined levers 20, the equalizing lever 30 is made considerably shorter and, accordingly, considerably lighter; at the same time, for a given amount of material in the equalizing bar, the latter will be stronger. The remaining brake levers 20 in this construction would be arranged vertically if possible, and at the same time provide a satisfactory structure; but in order to avoid interference with the bolster side bearings, said remaining truck levers 20 must be inclined as shown.

If the brake levers 20 were to be arranged vertically and connected to the fulcrums 18 in the position shown, it would be necessary to have large overhanging supports from the side frame. This, however, would be prohibitive. Clearances would not permit such an arrangement and, furthermore, considerable weight and expense would be added as a result of such large overhanging supports. Accordingly, to solve the problems here involved, all of the brake levers, with the exception of the brake levers at the live end of the truck, are inclined as described, the live lever in each case being vertically arranged and being connected to the equalizing lever, making it possible to shorten the latter.

It is my intention to cover all modifications of the invention falling within the spirit and scope of the following claims.

I claim:

1. In brake mechanism, brake beams located on opposite sides of a bolster, brake levers operatively connected to said brake beams, and a direct connection over the bolster between said brake lever, said levers being inclined to avoid interference with a portion of said bolster.

2. In brake mechanism, brake beams located on opposite sides of a bolster, brake levers operatively connected to said brake beams, a connection between said brake levers, said levers being inclined to avoid interference with a portion of said bolster, an equalizing lever, and a vertically arranged brake lever operatively connected to one of the inclined levers and to said equalizing lever whereby the latter may be relatively short.

Signed at Chicago, Illinois, this 20th day of May, 1919.

ARMAND H. PEYCKE.